Jan. 14, 1969     P. L. PANIGATI     3,421,786

REMOVABLE FASTENING DEVICE

Original Filed Oct. 11, 1965

INVENTOR
PierLuigi Panigati
BY
Agent

United States Patent Office 3,421,786
Patented Jan. 14, 1969

3,421,786
REMOVABLE FASTENING DEVICE
Pier Luigi Panigati, Via Friuli 64, Milan, Italy
Continuation of application Ser. No. 494,762, Oct. 11, 1965. This application Nov. 27, 1967, Ser. No. 685,981
Claims priority, application Italy, Oct. 14, 1964, 22,087/64
U.S. Cl. 292—256.65    3 Claims
Int. Cl. B65d 45/32; B65d 45/30

ABSTRACT OF THE DISCLOSURE

Pressure fluid operated power cylinders having removable head or bottom members and wherein the connection between the cylinder and the head or bottom members there of is provided by a snap ring which engages on the one side into a groove provided on the periphery of the head or bottom member, and on the other side into notches cut into the cylinder wall and spaced around the periphery thereof.

---

Figure 1:
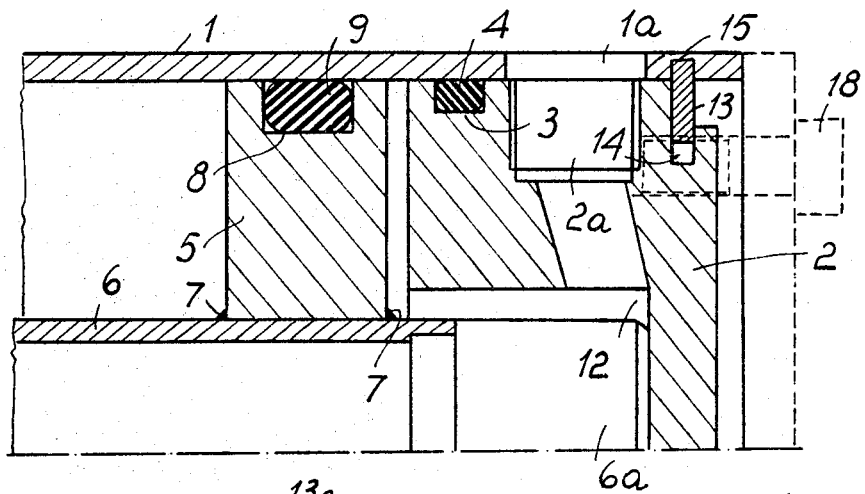

This is a continuation of application Ser. No. 494,762, filed Oct. 11, 1965, and now abandoned.

In the hydrodynamic cylinder manufacturing field in general, mechanical connections are known between two bodies, arranged one inside the other such as a member or members having substantially a disc-shaped configuration arranged in the inside of a tubular member the former forming the head or heads and the latter the body of the hydrodynamic cylinder. However the fasteners known hitherto have given rise to somewhat complex and scarcely practical connecting structures, which weigh exceedingly in any case on the making cost of the product.

So for example, one of the fasteners that proved to be one of the most convenient both from a technical and practical and economical standpoint for the manufacture of cylinders designed to operate in hydrodynamic circuits or systems, but involving a considerable employ of material and labour comparatively to the product type to be manufactured, is that providing for the connection between the head member or members and the tubular member constituting the hydrodynamic cylinder, and comprising a so-called split or elastic type ring adapted to lock said head member or members with said tubular member in only one of the directions parallel to the axis of the tubular member and either at least another ring similar to the previous one or any other locking means suitable for the locking in a direction opposite to the locking direction of the above-said ring.

It is the main object of this invention to fully obviate the aforementioned drawbacks by providing a connection between two bodies arranged one inside the other, and particularly, between the head member and the tubular body of the hydrodynamic cylinder in general by the use of one single member in cooperation with seats provided in said two bodies to be connected to each other.

It is another object of this invention to provide a connecting structure in conformity with the preceding object, and in which said connecting member is provided with such an annular configuration as to simultaneously engage both bodies to be rigidly locked.

It is further another object of this invention to provide the possibility whereby owing to the particular instrumentation of the connection provided according to the preceding objects one may proceed with assembling and disassembling of the hydrodynamic cylinders in a quick and safe manner.

It is finally another last but not least object of this invention to allow the aforesaid means, to be provided in conformity with the preceding objects in a particularly simple manner, to be of safe application effectiveness, practical and quick in assembling and disassembling, and involving above all a relatively economical cost.

Figure 2:
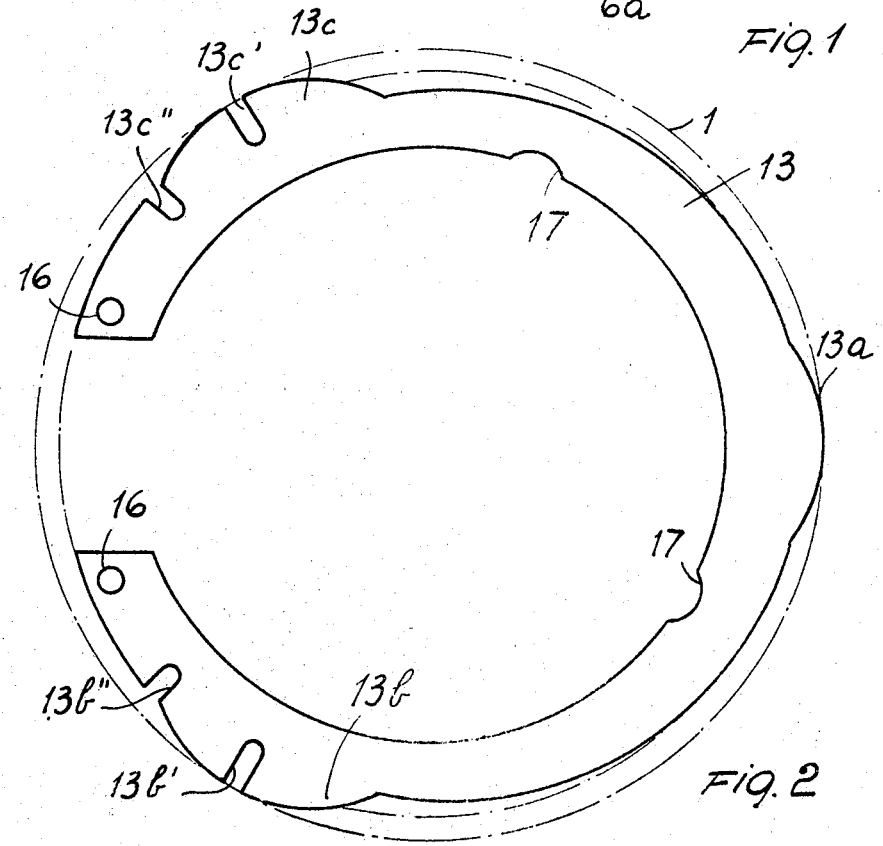

The characteristic features and advantages of the invention will become more apparent from the following detailed description of a preferred nonlimiting embodiment of the connecting structure according to the present invention when taken in conjunction with the accompanying drawing, in which:

FIG. 1 shows in a sectional view a symmetry half of a connecting structure applied to component parts of a hydrodynamic cylinder the section being taken according to a vertical plane passing through the longitudinal axis of said hydrodynamic cylinder, and FIG. 2 shows the front view of the connecting member.

The connecting structure according to the present invention is shown in the above figures applied by way of example to parts designed to form an operating hydrodynamic cylinder per se of an essentially already known structural design.

It, in fact, comprises (as appears from FIG. 1), a tubular member 1, designed to form the hollow body of the operating hydrodynamic cylinder and a head member or end member 2 of said operating hydrodynamic cylinder, designed to close one end of said cylinder body. The head member 2 is provided with an annular seat 3 to receive a toric gasket 4, designed to operate the annular seal between said parts 1 and 2, and specifically between the inner cylinder surface of the tubular body 1, and in the annular seat 3 of the member 2. Inside said tubular body 1 the piston 5 is slidable, which is secured in a fluidtight manner to the tubular stem 6 in any known manner, such as for example by means of the weldings 7. On the outer surface of the piston 5 there is provided an annular seat 8 receiving a toric gasket 9 operating the seal between said piston 5 and the tubular body 1.

The head member 2 is provided, on the side facing the inside of the tubular body 1, with a blind coaxial cavity 12 where the terminal end 6a of the tubular stem 6 freely penetrates at the end of its stroke. Through the tubular body 1 and the head member 2 there is provided the drilling 1a–2a or inlet and/or outlet duct of the cylinder.

According to the present invention, the connection between the tubular body 1 and the head member 2 is carried out by means of one single member 13 having an interrupted annular configuration (see FIG. 2), allowing it to be elastically deformed in its plane. The annular member 13 has along its outer peripheral edge three radial protuberances 13a–13b–13c lying in the same plane of the ring member 13, and is provided with an annular development the resisting section of which decreases from the radial protuberance 13a towards the radial protuberances 13b and 13c, respectively (see FIG. 2).

At the radial protuberances 13b–13c radial cuts 13b'–13b" and 13c'–13c" are provided in such a number and width as to adapt the section modulus in the zone of the protuberances to the section moduli of the other portions of the member 13, so as to safeguard the circular form of the ring 13 during the elastic deformation thereof. This member 13 is locked, as will be better seen further, in seats provided in the parts 1 and 2 and extending in a common plane perpendicular to the axis of the cylinder. The said seats are coaxial and radially spaced from each other and have their grooves facing each other.

In view of the above-described member 13, the seat in the head part 2 is constituted of an annular groove 14, whilst the seat in the tubular body 1 is constituted of three slots 15 extending according to an arc having a hight which is substantially respectively equal to the hight of the radial protuberances 13a–13b–13c and located in the plane of the annular member 13. Furthermore, the width of said annular groove 14 and said slots 15 in the axial direction to the cylinder is subsantially equal to that of the thickness of the member 13 or however such as to receive said member 13 in perfect adhering condition, so as to secure between the parts 1 and 2 and essentially rigid connection. With such a structure consisting of one single connecting member, hydrodynamic cylinders can be practically, quickly and simply assembled by proceeding in the following manner: the member 13 is first placed in one of the seats 14 or 15 of the parts to be connected to each other. Preferably the inner annular edge of ring member 13 is placed in the groove 14 of the part 2 after having elastically deformed said member 13 in its plane so as to diminish its diameter and subsequently leaving it to elastically deform in a direction opposite the previous one, i.e., to spread out while remaining in the inside of said annular groove 14. Thus under its elastic action the radial protuberances 13a–13b–13c thereof are caused to engage in the slots 15 of the part 1 thus obtaining the rigid connection between said parts 1 and 2.

It will be understood that in the assembled position the ring 13 tends to radially expand to the outside, prevented therefrom by the engaging surfaces of the body 1. It is further to be noted that the bottom of the annular seat 14 should have a smaller diameter than the inside diameter of the ring 13 and such that in the assembled position as represented in FIG. 1 the difference between said two diameters be at least equal to the difference between the maximum outside diameter of the ring 13 at the protuberance 13a in the assembled position thereof and the inside diameter of the hollow body 1. With such a dimension it will be possible to carry out quick assembling and disassembling operations, it being sufficient to introduce the tips of special pincers in the holes 16 provided for the purpose in the ring and to elastically deform the ring in the desired direction.

In the embodiment shown, the slots 15 have such a shape as to exactly mate the profile of the respective protuberance. Since the seats 15 and 14 have side walls acting as opposite stopping surfaces in engagement with the ring 13, said ring impedes any relative movement whatever in axial direction of the two members 1 and 2. In order to obtain also the locking of movements in a tangential or peripheral direction, in the ring 13 there are provided the recesses 17, in which may engage the special screws 18, indicated by section-lining, and screwed in holes specially provided in the head 2. In such manner any relative displacement whatever in a tangential direction is prevented just in view of the annular configuration of the slots 15 in face-to-face engagement with the protuberances 13a and others.

It should be borne in mind that the application points of the deforming forces of the ring coincide with the two holes 16 provided at the end of the ring itself. The decrease of the resisting section of the application points is explained by the need for a constant resistance modulus over the entire semicircle of the ring. This arrangement permits the ring to always retain its circular shape during the deformation process.

The above embodiment is obviously only given for exemplification purposes, and it is therefore understood that several changes and modifications may be introduced with particular regard to execution details, all falling within the scope of the present invention, as defined by the appended claims.

I claim:
1. A pressure fluid operated power cylinder having a tubular body, removable end members for closing the ends of the tubular body and wherein at least one of these end members is provided with a peripheral circular groove and said tubular body is provided with seat means at the inner surface of the cylindrical wall thereof, and facing said groove when said member is in assembled position thereof, and a snap ring adapted to be at least partially received in said groove and said seat means and wherein according to the improvement said seat means are slots provided in the wall of said tubular body and spaced around the periphery thereof, and the snap ring has radial protuberances adapted to engage within said slots when in assembled position, and wherein in assembled position the difference between the minimum diameter of the snap ring formation and the diameter of the bottom of said groove is at least equal to the difference between the maximum diameter of the snap ring formation and the inner diameter of said tubular body.

2. A cylinder according to claim 1, wherein said protuberances have radial recesses provided therein.

3. A cylinder according to claim 1, wherein said removable end members have an undercut peripheral portion at their extremities opposite to the interior of the power cylinder, said undercut peripheral portion defining a cylindrical portion of the respective end member protruding from the extremities thereof, said cylindrical portion having a diameter less than the diameter of the remaining portion of said end member, and wherein said peripheral circular groove is provided in said undercut peripheral portion.

No references cited.

RICHARD E. MOORE, *Primary Examiner.*